United States Patent Office 3,824,264
Patented July 16, 1974

3,824,264
PREPARATION OF MONOHYDROCARBYL
TIN TRIHALIDES
Eric Jan Bulten, Bilthoven, Netherlands, assignor to
Cosan Chemical Corporation, Clifton, N.J.
No Drawing. Filed June 8, 1972, Ser. No. 261,020
Int. Cl. C07f 7/22
U.S. Cl. 260—429.7
7 Claims

ABSTRACT OF THE DISCLOSURE

Monohydrocarbyl tin trihalides are produced in high yields by a process in which a stannous halide and a halohydrocarbon having at least one halogen bound to an aliphatic carbon atom are reacted in the presence of a catalytic amount of an organoantimony compound having at least one hydrocarbyl group bound to the antimony. The monohydrocarbyl tin trihalides prepared according to the process of this invention and their derivatives (such as hydrocarbyl stannonic acids) are important for the preparation of many biocides, polymer stabilizers and catalysts.

BACKGROUND OF THE INVENTION

The preparation of monohydrocarbyl tin trihalides by reacting a halohydrocarbon having at least one halogen atom bound to an aliphatic carbon atom with a stannous halide in the presence of various basic catalysts has been previously reported. British Patent 1,079,641 describes the preparation of such monohydrocarbyl tin trihalides by reacting such a halohydrocarbon with a stannous halide in the presence of a compound containing a divalent sulfur or selenium atom as the catalyst. U.S. Pat. 3,340,283 describes such a preparation using various amines as the catalyst, while U.S. Pat. 3,414,595 describes the use of various strong organic Lewis bases such as amines, phosphines, formamides or sulfones as the catalyst. U.S. Pat. 3,519,667 discloses the use of phosphonium halides as catalysts for the preparation of monohydrocarbyl tin trihalides from stannous halides and alkyl halides. One concludes from a consideration of the catalysts and product yields described in these prior art patents that the stronger the Lewis base used as the catalysts, the more efficient and reactive the process becomes. Additionally, the transfer of long chain alkyl groups cannot be satisfactorily accomplished by use of these various prior art catalysts; the present invention, however, provides for efficient transfer of long chain alkyl groups.

OUTLINE OF THE INVENTION

It has now been unexpectedly discovered that weakly basic organoantimony compounds having at least one hydrocarbyl group directly bound to the antimony are particularly active catalysts for the preparation of monohydrocarbyl tin trihalides by the reaction of halohydrocarbons having at least one halogen atom bound to an aliphatic carbon atom and stannous halides. Under the optimal conditions of this invention, almost quantitative conversions on the order of 90 to 100%, based upon the amount of stannous halide converted to the monohydrocarbyl tin trihalide, are achieved. The outstanding activity of these organoantimony compounds as catalysts in this reaction is unexpected since it is well known that the Lewis base strength of Group Va organo compounds decreases significantly as the atomic number of the Group Va element increases. The organoantimony compounds would thus be expected to be much less active catalysts than the prior art amines, phosphines and phosphonium halides. On the contrary, the organoantimony compounds possess comparable, in many instances superior, catalytic activity compared to the activity of the amines, phosphines or phosphonium halides.

Moreover, the stronger Lewis base organoarsenic compounds (arsenic is the next immediate Group Va element above antimony in the Periodic Table) are not considered effective catalysis for the reaction between halohydrocarbons and stannous halides to form monohydrocarbyl tin trihalides. Additionally, the high toxicity and volatility of organoarsenic compounds would make their use as catalysts dangerous and impractical.

One would therefore expect from a consideration of the prior art patent disclosures that the organoantimony compounds of this invention would be inactive and ineffective catalysts for the preparation of monohydrocarbyl tin trihalides from stannous halides and halohydrocarbons containing at least one halogen atom bound to an aliphatic carbon atom.

THE BASIC PARAMETERS OF THE INVENTION

The process of this invention can be schematically represented as follows:

$$SnX_2 + RX \xrightarrow{catalyst} SnRX_3$$

In this representation the R represents a hydrocarbyl group (or hydrocarbon, the terms being used interchangeably herein) and the X represents a halogen bound to an aliphatic carbon atom of the hydrocarbyl group. The invention is more fully described in the following discussion of the reactants, the catalysts and the useful reaction conditions.

*The Reactants.* The halohydrocarbons useful in the process of this invention are mono and polyhalogen-substituted hydrocarbons with at least one halogen atom bound to an aliphatic carbon atom. The aliphatic carbon atom may be part of an alkyl, aralkyl, or alkenyl group. The halogens are preferably chlorine, bromine or iodide since the bromides and iodides are generally more reactive and the chlorides are less expensive. Long chain alkyl monohalides are particularly easily transferred onto the tin atom according to the process of this invention.

Generally, the halohydrocarbons having at least one halogen atom bound to an aliphatic carbon atom useful in this invention contain up to about 20 carbon atoms or even more in the case of the haloalkyls. Examples include methyl iodide, ethyl bromide, n-butyl bromide, n-hexyl chloride, n-octyl chloride, lauryl bromide, cetyl chloride, octadecyl bromide. Other halohydrocarbons preferred for present use include unsaturated aliphatic halides such as allyl chloride or methallyl chloride and aliphatic halohydrocarbons containing aromatic unsaturation such as benzyl and substituted-benzyl halides.

It is a feature of the present invention that relatively inactive halohydrocarbons, such as the primary alkyl halides, may be used to prepare monohydrocarbyl tin trihalides and that these are obtained substantially free from the corresponding dihydrocarbyl tin dihalides and trihydrocarbyl tin monohalides.

The stannous halides useful are stannous fluoride, stannous chloride, stannous bromide and stannous iodide. For economic reasons, stannous chloride is generally the most useful of the four; however, stannous bromide and iodide are more reactive.

*The Catalysts.* The catalysts of the present invention are organoantimony compounds (trivalent or pentavalent) in which at least one hydrocarbyl group is bound directly to the antimony. If more than one hydrocarbyl group is bound to the antimony, they may be the same or different. If not all of the free valencies of the antimony atom are bound to hydrocarbyl groups, the remaining valencies will be bound to ionic atoms or radicals. Halogen atoms are particularly useful but in general all ionic groups or radical such as acylate, benzoate, hydroxyl, —SR in which R is an aromatic hydrocarbyl such as phenyl or benzyl, sulphate, nitrate, azide, triazolyl and the like are useful. Particularly active catalysts are trihydrocarbyl antimony compounds, specifically trialkyl antimony compounds.

Specific examples of organoantimony compounds useful as catalysts according to this invention are:

I. trihydrocarbylantimony compounds such as triethylantimony, tributylantimony, trioctylantimony, triphenylantimony, tribenzylantimony, dibutylethylantimony, diethylbutaylantimony or tricyclohexylantimony;

II. dihydrocarbylantimony halides such as diethylantimony bromide, dibutylantimony bromide, dibutylantimony chloride, dioctylantimony bromide or diphenylantimony chloride;

III. hydrocarbylantimony dihalides such as ethylantimony dibromide, butylantimony dibromide, phenylantimony dibromide or tolylantimony dibromide;

IV. pentahydrocarbylantimony compounds such as tributyldiethylantimony, pentaethylantimony or pentabenzylantimony;

V. tetrahydrocarbylantimony halides such as tetrabutylantimony bromide, tetraphenylantimony bromide or tetraphenylantimony iodide;

VI. trihydrocarbylantimony dibromides such as triethylantimony dichloride, tributylantimony dibromide, diethylpropylantimony dichloride or triphenylantimony dibromide; and VII. tetrahydrocarbyldiantimony compounds such as tetraphenyldiantimony, tetrabutyldiantimony, diethyldipropyldiantimony or tetraethyldiantimony.

*The Reaction Conditions.* The process of this invention is normally conducted at temperatures from about 25° to 275° C. It has been found that when operating within the range of about 130° to 170° C. the optimal conversion of stannous halide occurs. Within that temperature range, almost quantitative conversions on the order of 90 to 100%, based upon the amount of stannous halide converted, are achieved. Ambient pressures are generally suitable; however, sub or super-atmospheric pressures may be employed.

The process of this invention can be carried out in the presence of an inert organic solvent or alternatively by simply mixing the reactants using an excess of the halohydrocarbon reactant. "Inert" organic solvents contemplate organic solvents which do not interfere with the reaction by reaction or complex formation with either reactant. Among the solvents found useful in this invention are aliphatic, cycloaliphatic and aromatic hydrocarbons such as hexane, petroleum ether fractions, benzene or xylenes.

The amount of catalyst used in this invention should be sufficient to provide efficient conversion of the reactants to form monohydrocarbyl tin trihalides. Normally, about 0.001 to 0.5 mol, preferably about 0.01 to 0.1 mol, of organoantimony catalysts per mol of halohydrocarbon reactant should be used.

The necessary reaction times for the process of this invention vary considerably. However, the duration of the reaction can be significantly reduced by utilizing an excess of one of the reactants. Due to ecominic and process considerations it is advantageous to use an excess of the halohydrocarbon reactant. The excess halohydrocarbon also serves as a solvent during the reaction. After cessation of the reaction, the excess halohydrocarbon can be recovered and recycled with ease.

Using particular conditions such as temperatures within the range of about 130° to 170° C. and an excess of the halohydrocarbon, it is possible to achieve almost quantitative conversions on the order of 90 to 100%, based upon the amount of stannous halide converted, to the monohydrocarbyl tin trihalides. Side reactions resulting in the preparation of dihydrocarbyl tin dihalide or trihydrocarbyl tin halides do not occur to any notable extent.

The monohydrocarbyl tin trihalide products of the process of this invention can be recovered or isolated from the reaction mass by conventional distillation or solvent extraction techniques. If the nature of the monohydrocarbyl tin trihalides is such as to effectively preclude the use of such conventional recovery means, the monohydrocarbyl tin trihalides can be converted to the corresponding hydrocarbyl stannonic acid (RSnOOH) by treatment with a base. The hydrocarbyl stannonic acids are useful as water repellents; however, they can be easily reconverted to the monohydrocarbyl tin trihalides by treatment with hydrogen halides.

SPECIFIC EXAMPLES

The following specific Examples represent non-limitative, preferred embodiments of the invention. Although only stannous chloride and stannous bromide are specifically exemplified, all the stannous halides, i.e. fluoride, chloride, bromide and iodide, are contemplated as being useful in the process of this invention. In these examples the yields are calculated on the basis of the amount of stannous halide converted, unless otherwise indicated.

*Example 1*

A mixture of 7 g. (25 mmol) of $SnBr_2$, 25 g. (75 mmol) of $C_{18}H_{37}Br$ (normal $C_{18}H_{37}$) and 0.6 g. (1.3 mmol) of $(n-octyl)_3Sb$ was stirred for 72 hours under nitrogen at 150° C. After 24, 48 and 72 hours respectively a sample was taken, filtered and analyzed for ionically bound bromine from $C_{18}H_{37}SnBr_3$. After 24 hours 68.5%, after 48 hours 82.5% and after 72 hours 92.5% of the $SnBr_2$ had been converted into $C_{18}H_{37}SnBr_3$. After the 72 hours had elapsed 150 ml. of benzene were added to the reaction mixture and by filtration 0.52 g. (7.4%) of $SnBr_2$ were recovered.

The filtrate was then refluxed for 2.5 hours with 80 ml. of 1 N NaOH-solution in water. The white solid was filtered off, washed with benzene and acetone and dried. The yield was 7.95 g. of n-octadecyl stannonic acid. After concentrating and treating with acetone from the mother liquor another 1.75 g. were obtained. So the total yield was 9.7 g. of n-octadecyl stannonic acid, which was 100% calculated on the converted amount of $SnBr_2$ converted. From the combined mother liquors another 15 g. of $C_{18}H_{37}Br_3$ were recovered.

*Example 2*

A mixture of 3.5 g. (12.5 mmol) of $SnBr_2$, 12.5 g. (37.5 mmol) of $C_{18}H_{37}Br$ and 0.3 g. (0.65 mmol) of tri-n-octylantimony was stirred for 24 hours under nitrogen at 170° C. After adding 75 ml. of benzene 1.75 g. of $SnBr_2$ were recovered by filtration. From this it follows that under these conditions 50% conversion of the $SnBr_2$ took place.

Another reaction mixture identical in composition was stirred for 24 hours at 130° C. Under these conditions only 36% conversion of the $SnBr_2$ had taken place.

A comparison of these results with those given in Example 1 shows that the conversion proceeds optimally in the temperature range of 130–170°.

*Example 3*

Of the $SnBr_2$ recovered in Example 2, 3.5 g. (12.5 mmol) were reacted with 12.5 g. (37.5 mmol) of $C_{18}H_{37}Br$ and 0.3 g. (0.65 mmol) of tri-n-octylantimony for 48 hours at 150° C. under nitrogen. Working up of the reaction mixture in the way as described in Example 1 showed that 82.5% of the $SnBr_2$ has been converted. 4.0 g. of octadecyl stannonic acid were isolated, which corresponds to a yield of 92% calculated on the amount of $SnBr_2$ converted. 8.2 g. (24.6 mmol) of $C_{18}H_{37}Br$ were recovered. Thus, the unconverted $SnBr_2$ can be easily recirculated.

Example 4

A mixture of 12.5 g. of $C_{18}H_{37}Br$, containing 8.2 grams recovered from the experiment according to Example 3 plus 4.3 g. of a commercial product, 3.5 g. (12.5 mmol) of $SnBr_2$ and 0.3 g. (0.65 mmol) of tri-n-octylantimony was stirred for 48 hours at 150° C. Working up as described in Example 2 showed that 83% of the $SnBr_2$ has been converted. Unconverted $C_{18}H_{37}Br$ can thus also be easily recirculated.

Example 5

A mixture of 3.5 g. (12.5 mmol) of $SnBr_2$, 12.5 g. (37.5 mmol) of $C_{18}H_{37}Br$ and 0.14 g. (0.48 mmol) of tri-n-butylantimony was stirred under nitrogen at 150° C. After 17 hours 90% of the $SnBr_2$ had been converted. Working up of the reaction mixture as described in Example 1 yielded 100% of $C_{18}H_{37}SnOOH$ calculated on the $SnBr_2$ converted.

Example 6

A mixture of 24.5 g. (87.5 mmol) of $SnBr_2$, 87.5 g. (262.5 mmol) of $C_{18}H_{37}Br$ and 0.88 g. (4.2 mmol) of triethylantimony was stirred under nitrogen at 150° C. After 10 hours 97% of the $SnBr_2$ has been converted. Working up as described in Example 1 yielded 37 g. of $C_{18}H_{37}SnOOH$, which corresponds to a yield of 100% calculated on the $SnBr_2$ converted and 97% calculated on the initial amount of $SnBr_2$.

Example 7

A mixture of 1.75 g. (6.3 mmol) of $SnBr_2$, 6.25 g. (19 mmol) of $C_{18}H_{37}Br$ and 0.09 g. (0.3 mmol) of tri-n-butylantimony was heated for 4 hours at 150° C. In doing so, 43% of $SnBr_2$ were converted. In otherwise identical experiments in which the tributylantimony was replaced by triethylantimony (0.3 mmol) and by trimethylantimony (0.3 mmol), 69% and 80% respectively of the $SnBr_2$ was converted. By this it is shown that the catalyst activity of the $R_3Sb$ increases when the chain length of the hydrocarbyl substituent R decreases.

Example 8

A mixture of 3.5 g. (12.5 mmol) of $SnBr_2$, 12.5 g. (37.5 mmol) of $C_{18}H_{37}Br$ and 0.16 g. (0.6 mmol) of diethylantimony bromide was stirred for 72 hours at 150° C. Working up took place as according to Example 2 whereupon it was found that 75% of the $SnBr_2$ had been converted.

Example 9

A mixture of 3.5 g. (12.5 mmol) of $SnBr_2$, 12.5 g. (37.5 mmol) of $C_{18}H_{37}Br$ and 0.22 g. (0.6 mmol) of triphenylantimony was stirred for 72 hours at 150° C. Working up took place as according to Example 2 whereupon it was found that 35% of the $SnBr_2$ had been converted.

Example 10

A mixture of 3.5 g. (12.5 mmol) of $SnBr_2$, 7.3 g. (37.5 mmol) of $C_8H_{17}Br$ and 0.3 g. (0.65 mmol) of tri-n-octylantimony was stirred for 48 hours at 150° C. 93% of $SnBr_2$ had been converted. Gas-chromatographic analysis of the reaction mixture showed that 9.5 mmol of octyltin tribromide had been formed, which corresponds to a yield of 82% calculated on the amount of $SnBr_2$ converted.

Example 11

A mixture of 42 g. (0.15 mmol) of $SnBr_2$, 87 g. (0.45 mmol) of n-octylbromide and 1.6 g. (7.5 mmol) of triethylantimony was stirred for 18 hours at 150° C., 97% of the $SnBr_2$ being converted. Working up of the reaction mixture in the way as described in Example 1 yielded 37 g. (93%) of octylstannonic acid, 48 g. (0.25 mmol) of octylbromide being recovered.

The octylstannonic acid was boiled for 3 hours with 6N HCl, and the reaction mass then separated and distilled. In doing so, 37.5 g. (77%) of n-octyltin trichloride was obtained boiling-point 103–106° C., 0.1 mm., $N_D^{20}$ 1.5045.

Example 12

A mixture of 3.5 g. (12.5 mmol) of $SnBr_2$, 5.6 g. (37.5 mmol) of n-octylchloride and 0.1 g. (0.5 mmol) of triethylantimony was stirred for 48 hours at 150° C. In doing so, 78% of $SnBr_2$ were converted.

Example 13

A mixture of 2.46 g. (12.5 mmol) of $SnCl_2$, 7.25 g. (37.5 mmol) of n-octylbromide and 0.1 g. (0.5 mmol) of triethylantimony was stirred for 20 hours at 150° C. In the process, 94% of $SnCl_2$ was converted.

Example 14

A mixture of 2.46 g. (12.5 mmol) of $SnCl_2$, 5.6 g. (37.5 mmol) of n-octylchloride and 0.1 g. (0.5 mmol) of triethylantimony was stirred for 96 hours at 150° C. 31% of $SnCl_2$ were converted.

Examples 11 to 14 inclusive indicate that the reaction between tin dichloride or tin dibromide and the hydrocarbyl halide proceeds optimally when the halide is a bromide. When tin dichloride and hydrocarbyl chloride are used the reaction proceeds more slowly.

Example 15

A mixture of 3.5 g. (12.5 mmol) of $SnBr_2$, 5.5 g. (37.5 mmol) of n-butylbromide and 0.11 g. (0.6 mmol) of tri-n-butylantimony was boiled for 48 hours reflux (101° C.). 75 ml. of benzene were added to the reaction mass and the unconverted $SnBr_2$ was filtered off. It was found that 91% of $SnBr_2$ had been converted. From the filtrate the benzene was evaporated in vacuum, 4.5 g. of n-butyltin tribromide being obtained; this represents a yield of 95% calculated on the amount of $SnBr_2$ converted.

Example 16

A mixture of 55.6 g. (0.2 mmol) of $SnBr_2$, 82 g. (0.6 mmol) of n-butylbromide and 2.1 g. (0.01 mmol) of triethylantimony was boiled for 48 hours under reflux (101° C.). By distillation 50 g. (0.37 mmol) of n-butylbromide were recovered from the reaction mixture. The residue was treated with 75 ml. of benzene and the unconverted $SnBr_2$ was filtered off, whereupon it was found that 78% of $SnBr_2$ had been converted. The filtrate was concentrated in vacuum and the residue was boiled for 2.5 hours with 80 ml. of 1 N NaOH solution. Then the reaction mixture was neutralized with $CO_2$ and the butylstannonic acid formed was filtered off and dried to yield 24.9 g., which corresponds to 76% calculated on the converted amount of $SnBr_2$.

Example 17

1.75 g. (6.25 mmol) of $SnBr_2$ was placed in a reaction vessel filled with nitrogen; then the vessel was evacuated and a methylbromide was added. Next 0.05 g. (0.25 mmol) of triethylantimony was added and the reaction mixture was heated for 8 hours at 130° C. During the reaction a constant pressure (77 cm. mercury) was maintained. The partially liquid reaction mixture was then extracted with 75 ml. of benzene. 0.50 g. of $SnBr_2$ was left, which corresponds to a conversion of 72%.

The benzene filtrate was evaporated in vacuum and 1.7 g. of pure methyltintribromide (m.p. 53°) was left, which corresponds to a yield of 100% calculated on converted $SnBr_2$.

It is claimed:

1. The process for the preparation of monohydrocarbyl tin trihalides which comprises reacting a halohydrocarbon having at least one halogen atom bound to an aliphatic carbon atom of an alkyl, aralkyl or alkenyl group with a stannous halide in the presence of a catalytic amount of an organoantimony compound having at least one hydrocarbyl group bound to the antimony, the other groups bonded to antimony being selected from hydrocarbyl and halogen.

2. A process according to claim 1 in which the reaction is conducted in the presence of 0.001 to 0.5 mols of the organoantimony compound per mole of halohydrocarbon.

3. A process according to claim 1 in which the reaction is conducted between 130° and 170° C.

4. A process according to claim 1 in which the organoantimony compound is a trihydrocarbylantimony or mixture thereof.

5. A process according to claim 1 in which the stannous halide is stannous chloride or stannous bromide.

6. A process according to claim 1 in which the halohydrocarbon is an alkylmonohalide.

7. A process according to claim 6 in which the alkylmonohalide is a chloride or bromide.

References Cited

UNITED STATES PATENTS

| | | | |
|---|---|---|---|
| 3,595,892 | 7/1971 | Van den Hurk | 260—429.7 |
| 3,415,857 | 12/1968 | Hoye | 260—429.7 |
| 3,387,012 | 6/1968 | Jasching et al. | 260—429.7 |
| 3,414,595 | 12/1968 | Oakes | 260—429.7 |
| 3,440,255 | 4/1969 | Matsuda et al. | 260—429.7 |
| 3,387,011 | 6/1968 | Coates et al. | 260—429.7 |
| 3,287,386 | 11/1966 | Neumann | 260—429.7 |
| 2,665,286 | 1/1954 | Passino et al. | 260—429.7 X |
| 3,027,393 | 3/1962 | Jenkner et al. | 260—429.7 |

DANIEL E. WYMAN, Primary Examiner

P. F. SHAVER, Assistant Examiner